United States Patent Office 3,350,341
Patented Oct. 31, 1967

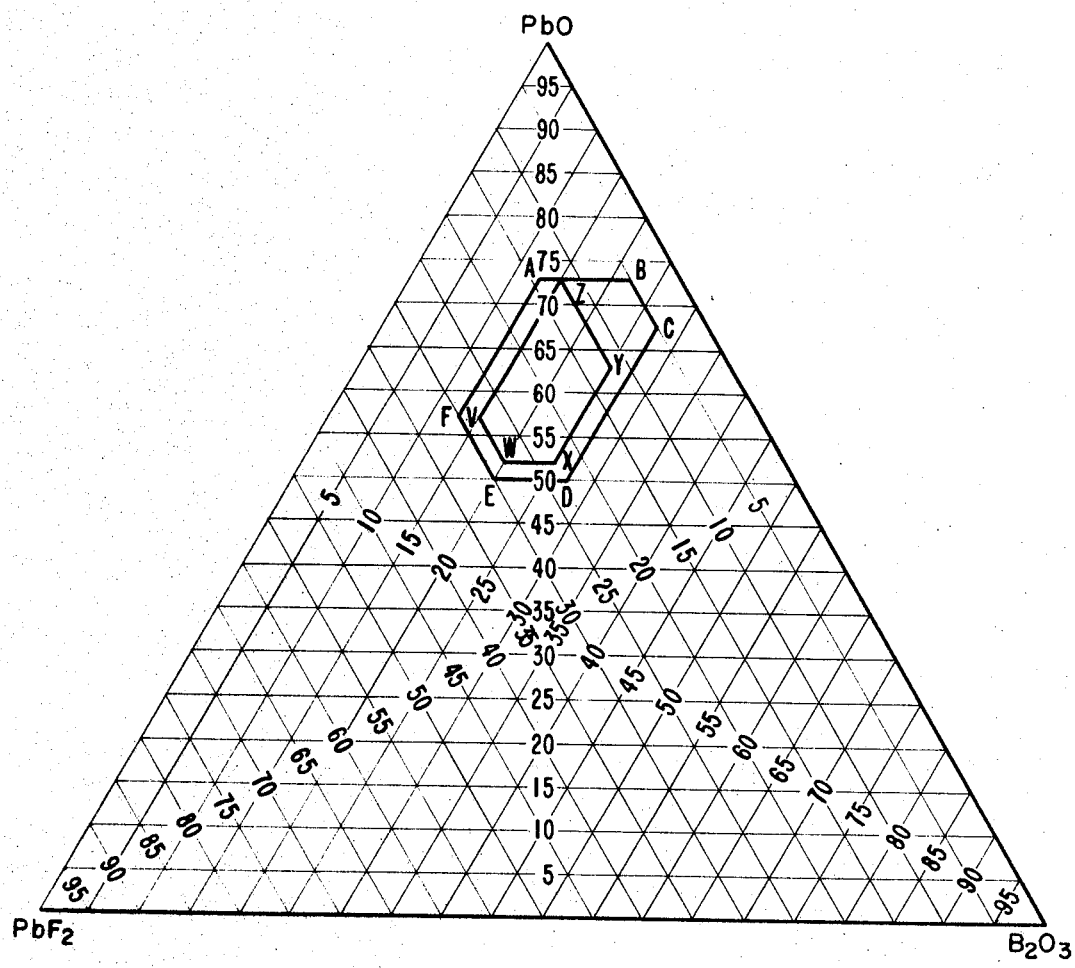

3,350,341
SILVER COMPOSITIONS CONTAINING NOVEL VITREOUS BINDERS AND A VEHICLE
Oliver A. Short, Wilmington, Del., assignor to E. I. du Pont de Nemours and Company, Wilmington, Del., a corporation of Delaware
Filed July 16, 1964, Ser. No. 383,052
6 Claims. (Cl. 260—29.8)

This invention relates to improved silver compositions for the production of fired-on silver coatings and to improved vitreous binders for use in such silver compositions.

Silver compositions or paints for use in metallizing ceramic surfaces for electrical purposes must be fired on such surfaces at a temperature sufficiently high to produce good adhesion and the fired-on silver must be readily solderable to electrical lead wires or other metallic connectors. It is common to fire at about 1400° F. when the ceramic base is a material such as steatite, alumina or an alkaline earth metal titanate. However, if the firing temperature is substantially below 1300° F., adhesion of the presently available silver compositions is greatly diminished and if the firing is above about 1450° F. soldering of the fired-on silver coating or film is nearly impossible. Various ceramic materials, such as lead zirconate, lead zirconate titanate and alkali metal niobates, now available as dielectric bases for silver films are relatively heat sensitive and may suffer changes in important predetermined electrical properties at various firing temperatures between 1200 and 1500° F. On the other hand, high dielectric constant barium titanate bases readily withstand firing temperatures up to 1500° F. without change of properties and such high temperatures are desirably used to obtain firm adhesion of present silver compositions. There is, therefore, a need for a silver composition which can be used to produce highly adherent and readily solderable fired-on silver coatings or films at firing temperatures as low as 1100° F. and as high as 1500° F. Such a wide effective firing temperature range would permit use of the silver composition with most of the dielectric ceramic bases now available.

Accordingly, a chief object of the invention is to provide improved silver compositions useful for the production of fired-on silver coatings on ceramic dielectric bodies, which compositions give highly adherent and readily soldered coatings at firing temperatures over the entire range of 1100 to 1500° F. A further object is to provide vitreous binders particularly useful as components of such silver compositions. Still further objects will be apparent from the following description.

The improved silver compositions of the invention comprise, on a weight percent basis:

A. 35 to 70% finely divided silver flake powder
B. 10 to 25% vitreous binder
C. 15 to 45% organic vehicle The composition may include minor amounts of other additives and impurities, but components A, B and C together should constitute at least 95% of the total weight of the composition.

The finely divided flake silver (component A) is readily prepared by milling finely divided precipitated silver powder, e.g., 0.1 to 0.5 micron in diameter and having an apparent or powder density of 0.8 to 1.2 g./ml., with glass balls in the presence of 1 to 5% (based on the weight of the silver) of an alkali metal fatty acid soap such as sodium stearate for about 16 to 72 hours. Such silver flake powders are available commercially.

The vitreous binder (component B) contains 70 to 95%, preferably 87 to 92%, bismuth oxide, or a material such as bismuth subnitrate which will decompose to yield bismuth oxide in the desired amount during the firing, and 5 to 30%, preferably 8 to 13%, of a finely divided lead fluoborate glass frit composed of 50 to 73% PbO, 5 to 30% $PbF_2$ and 13 to 27% $B_2O_3$. Frits of such compositions are represented by the area ABCDEF of the accompanying ternary diagram for the system PbO-$PbF_2$-$B_2O_3$. The binder can tolerate minor amounts of materials other than the oxides indicated, including impurities or contaminants derived from the raw materials used, those derived from the melting pot used in preparing the frit, and those derived from attrition of the mill balls and ball mill lining during the milling of the frit. However, such other materials should not constitute more than 10% of the total weight of the binder. Lead fluoborate glass frits of compositions substantially outside those indicated above give silver coatings which are insufficiently adherent, particularly when fired at temperatures below 1400° F. The preferred frits are those whose compositions fall within area ZYXWV of the ternary diagram. They are composed of 52 to 73% PbO, 12 to 28% $PbF_2$ and 15 to 25% $B_2O_3$.

The glass frit may be prepared by any well-known fritting method. Thus, it can be prepared by melting together in the desired proportions PbO, $PbF_2$ and $B_2O_3$, or compounds which yield such oxides upon melting, fritting the melt by pouring it into water; drying the resulting frit, and then grinding it in a ball or other suitable mill to a finely divided state.

The vitreous binder can be preformed by mixing the powdered frit and the bismuth oxide in the required proportions, and the mixture used as such in preparing the silver composition. Alternatively, the frit-bismuth oxide mixture may be first sintered then ball milled to give a mixture of composite frit-bismuth oxide particles. A third alternative is to melt the frit components and bismuth oxide together, and frit the melt. A fourth and preferred alternative is to add the powdered frit and the bismuth oxide separately in forming the silver composition.

The organic vehicle (component C) is a 15 to 30% solution of a polymethacrylate (molecular weight of 100,000 to 400,000) of a 1 to 4 carbon aliphatic alcohol, e.g., methyl, ethyl, propyl, isopropyl, n-butyl and iso-butyl alcohols, in pine oil. The vehicle may contain small amounts, up to about 5% of its weight, of other materials such as a wetting agent or normal impurities. The pine oil solvent mixture is available commercially.

The silver composition is prepared by thoroughly mixing in proper proportions the vehicle, the silver flake powder and the vitreous binder. The composition may be applied to ceramic bodies in any desired way, e.g., by spraying, brushing or by means of a stencil screen. The coated ceramic body may then be fired directly, or it may first be air-dried then fired.

It is a characteristic advantage of the present silver compositions that coatings thereof on ceramic bodies may be fired at any temperature from 1100 to 1500° F. to give very firmly adherent fired-on coatings which are readily soldered using the usual soft solder containing, for example, about 50% tin and 50% lead. The solder will preferably contain a small amount of silver as in the solder commonly used for soldering ceramic capacitors which contains 62% tin, 36% lead and 2% silver.

It has been found that the use of silver flake powder, a vitreous binder which includes a lead fluoborate frit of the composition indicated, an organic vehicle in which the organic binder is a polymethacrylate of a lower alcohol and is dissolved in pine oil, all in the stated proportion ranges, is essential to the obtainment of a silver composition which will adhere tenaciously when fired at any temperature within the range 1100 to 1500° F. on a ceramic base that will tolerate such temperatures. Due to the bismuth oxide content of the vitreous binder component, the resulting fired on coating will also be readily solderable, regardless of the particular temperature within the above range at which firing is effected. Thus, the silver compositions are usable to obtain highly adherent and readily soldered coatings when fired at from 1100 to 1500° F. Such a wide effective firing range for a given composition is unique and highly advantageous in that a single silver composition can be used to produce excellent fired-on silver coatings on a wide variety of dielectric ceramic bodies, some of which require low firing temperatures whereas others may use high firing temperatures.

The invention is illustrated by the following examples. In the examples and elsewhere, all parts and percentages are by weight.

*Example 1*

A frit was made by melting together 65 parts PbO, 15 parts $PbF_2$ and 35.5 parts $H_3BO_3$ and pouring the melt into water. The frit was ball milled to a finely divided powder in a porcelain mill with porcelain balls and water. After drying, the resulting frit powder contained approximately 65% PbO, 15% $PbF_2$ and 20% $B_2O_3$ together with small amounts of alumina and silica and a trace of iron oxide as impurities derived from the crucible used in the melting step and from attrition of the mill and the porcelain balls used in the milling step.

A silver flake powder was prepared by milling a precipitated silver powder with 1.0% sodium stearate, based on the silver, and glass balls for 64 hours in the presence of water. The silver flake powder, 62.3 parts, was mixed with 2.3 parts of the above frit, 9.0 parts of bismuth oxide and 26.5 parts of a vehicle containing 19% polybutyl methacrylate (molecular weight about 200,000) and 81% pine oil. The resulting composition contained 62.2% silver, 11.3% vitreous binder (consisting of 20.4% frit and 79.6% $Bi_2O_3$) and 26.5% vehicle.

The above silver composition was printed on titanium dioxide wafers and fired thereon at temperatures ranging from 1000 to 1500° F. The resulting silver coatings were then soldered to tinned copper wire leads at 410° F. using a solder composed of 62% Sn, 36% Pb and 2% Ag. For all silver coatings fired at all temperatures except 1500° F., soldering was rapid and resulted in a smooth even coat. For the silver coatings fired at 1500° F., solder wetting was inferior in that an uneven coat resulted. However, in all cases, soldered joints were formed which required at least 9 lbs. of pull on the wire to strip the wire from the soldered silver.

*Example 2*

A silver composition was made as described in Example 1 except that 18 (instead of 9) parts of bismuth oxide was used to give a ceramic binder containing 88.7% $Bi_2O_3$ and 11.3% frit. The resulting silver composition when tested as described in Example 1 gave at all firing temperatures silver coatings exhibiting excellent solderability and in all cases a pull of at leaest 14 lbs. was required to strip the wire from the soldered silver.

*Example 3*

A silver composition was prepared as described in Example 1 except that its frit component contained 60% PbO, 30% $PbF_2$ and 10% $B_2O_3$. When the composition was tested as described in Example 1, only 3 to 4 lbs. of pull were required to strip the wire leads from the soldered silver coatings which had been fired at 1100° F. and 1200° F. At higher firing temperatures this frit was satisfactory with respect to both adhesion and solderability. A corresponding silver composition was made with frit containing 65% PbO, 30% $PbF_2$ and 5% $B_2O_3$. When a coating thereof was fired on at 1100° F. and the fired coating was soldered, less than 1 lb. of pull was required to strip the wire from the soldered silver.

*Example 4*

Similar silver compositions made with frits containing 75% and more PbO when tested as in the above examples, gave pull test values of 0 to 5 lbs. for silver coatings fired at below 1400° F., but adhesion was satisfactory (10 lbs. or more) between 1400° F. and 1500° F. with good solderability.

*Example 5*

A silver composition was prepared as described in Example 1 except that the vehicle employed was a 5% solution of ethyl cellulose in pine oil. The silver coatings resulting from its use at all firing temperatures were much less adhesive (5 to 8 lbs.) than those resulting from the silver composition of Example 1.

Similar tests established that vehicles containing rosin or polyvinyl acetate as the organic binder were also inferior to the polymethacrylate-based vehicle in this same respect.

*Example 6*

A silver composition similar to that of Example 1 was prepared using precipitated silver powder which had not been flaked. A corresponding composition was prepared except that the same precipitated silver was flaked as described in Example 1 prior to its use. The composition with the unflaked silver resulted in coatings fired at 1200° F., 1300° F. and 1400° F. which gave pull test values, respectively, of 3.5, 7.6 and 9.4 lbs., whereas the corresponding values for coatings from the composition containing the flaked silver were, respectively, 10.3, 13.2 and 12.8 lbs.

The results of the above examples show that the kind of silver, the composition of the viterous binder, particularly the frit component thereof, and also the kind of vehicle used, all affect to a significant extent the adhesive properties of the resultant fired on silver coatings, particularly when firing temperatures below about 1400° F. are used. It has been found that the combination of flake silver powder with a vitreous binder and a vehicle of the kinds defined above and in the proportions indicated is essential to the obtainment of silver compositions which can be fired on at any temperature from 1100° F. to 1500° F. to give satisfactorily adherent coatings (pull test values of at least 9 lbs.). Such compositions also yield "fired on" coatings exhibiting excellent solderability, which highly desirable property is contributed to by all components of the composition but especially by the high bismuth oxide content of the vitrifiable flux.

The embodiments of the invention in which an exclusive property or privilege is claimed are as follows:

1. A glass frit consisting essentially of, by weight, 50 to 73% PbO, 5 to 30% $PbF_2$, 13 to 27% $B_2O_3$.

2. A glass frit of a composition within the area ZYXWV of the accompanying ternary diagram for the system $PbO$-$PbF_2$-$B_2O_3$.

3. A vitreous binder consisting essentially of, by weight, 70 to 95% bismuth oxide and 5 to 30% of a glass frit consisting essentially of, by weight, 50 to 73% PbO, 5 to 30% $PbF_2$, 13 to 27% $B_2O_3$.

4. A vitreous binder consisting essentially of, by weight, 87 to 92% bismuth oxide and 8 to 13% of a glass frit of a composition within area ZYXWV of the accompanying ternary diagram for the system $PbO$-$PbF_2$-$B_2O_3$.

5. A silver composition consisting essentially of, by weight, 35 to 70% finely divided silver flake powder, 10 to 25% of a vitreous binder, 15 to 45% of an organic vehicle and not to exceed 5% other materials, including impurities; said vitreous binder consisting essentially of, by weight, 70 to 95% bismuth oxide and 5 to 30% of a glass frit consisting essentially of, by weight, 50 to 73% PbO, 5 to 30% $PbF_2$, 13 to 27% $B_2O_3$; and said vehicle consisting essentially of, by weight, 15 to 30% of a polymethacrylate of a 1 to 4 carbon aliphatic alcohol, 70 to 85% of pine oil and not to exceed 5% other materials, including impurities.

6. A silver composition according to claim 5 wherein the vitreous binder consists essentially of, by weight, 87 to 92% bismuth oxide and 8 to 13% of a glass frit of a composition within area ZYXWV of the accompanying ternary diagram for the system $PbO$-$PbF_2$-$B_2O_3$.

References Cited
UNITED STATES PATENTS

| | | | |
|---|---|---|---|
| 2,356,317 | 8/1944 | Harbert et al. | 106—49 |
| 2,385,580 | 9/1945 | Knox | 260—41 |
| 2,508,511 | 5/1950 | Goodman | 106—49 |
| 2,610,127 | 9/1952 | Kerridge et al. | 106—49 |
| 2,695,275 | 11/1954 | Gray | 260—41 |
| 2,833,030 | 5/1958 | Peaslee | 260—41 |
| 3,115,415 | 12/1963 | Hoffman | 106—49 |

JULIUS FROME, *Primary Examiner.*

L. T. JACOBS, *Assistant Examiner.*

UNITED STATES PATENT OFFICE
CERTIFICATE OF CORRECTION

Patent No. 3,350,341　　　　　　　　　　　　October 31, 1967

Oliver A. Short

It is hereby certified that error appears in the above numbered patent requiring correction and that the said Letters Patent should read as corrected below.

Column 3, line 48, for "1000" read -- 1100 --; column 4, line 41, for "viterous" read -- vitreous --.

Signed and sealed this 19th day of November 1968.

(SEAL)
Attest:

Edward M. Fletcher, Jr.　　　　　　　　　　　EDWARD J. BRENNER
Attesting Officer　　　　　　　　　　　　　　Commissioner of Patents